May 16, 1944. H. F. DOBSCHA Re. 22,479

BLAST FURNACE CINDER NOTCH STOPPER

Original Filed Aug. 27, 1940

*Inventor:*
HERMAN F. DOBSCHA,
by: John E. Jackson
his Attorney.

Reissued May 16, 1944

Re. 22,479

UNITED STATES PATENT OFFICE 22,479

BLAST FURNACE CINDER NOTCH STOPPER

Herman F. Dobscha, North Braddock, Pa.

Original No. 2,294,162, dated August 25, 1942, Serial No. 354,439, August 27, 1940. Application for reissue August 14, 1943, Serial No. 498,610

5 Claims. (Cl. 266—42)

This invention relates specifically to blast furnace cinder notch stoppers.

Blast furnaces are provided with a cinder notch through which the slag is removed from the furnace. This opening is water-cooled by an arrangement consisting of an outer frusto-conical shaped cinder cooler, a similarly shaped intermediate water-cooled element termed the "monkey cooler," and a monkey which forms the opening, also water-cooled. The cinder notch stopper, termed the "bott," is provided with internal threads for mounting upon a cooling water return pipe. Cooling water is supplied to the bott through a smaller pipe which is concentrically disposed within the return pipe.

The effect of the cooling water circulated within the bott is to cause the formation of a coating of slag about the surface of the bott after the latter has been inserted in the monkey. As the monkey and the bott protrude into the interior of the furnace, these elements are exposed to the heat of the molten slag. The slag coating which is formed is intended to protect the bott, particularly its nose portion, from this intense heat.

Heretofore, considerable difficulty has been experienced in removing the bott from the cinder notch to drain off the slag from the underlying molten pig iron.

These difficulties have been attributed to the fact that the cooling effect obtained in the bott is not uniform and is not directed at the areas where it is most urgently needed, and further, that the protective slag coating is not uniformly developed about a given peripheral portion of the bott. These unfavorable conditions are believed to be due to the lack of certain considerations in the design of prior cinder notch stoppers or botts.

It is the primary object of my invention to provide a stopper of improved design by the use of which a better cooling effect is obtained in the nose portion so that circumferentially uniform protective coating is formed about the exposed outer surface.

In prior known designs, the bott is usually provided with a cooling water supply pipe disposed within a return pipe. Such supply pipe extends into the interior of the bott and terminates in a discharge opening adjacent the forward or nose end of the bott. Cooling water flows from the supply pipe from a suitable circulating system, the rear of the supply pipe being mounted within the return pipe by means of a suitable elbow or T fitting. Due to the fact that in prior devices the supply pipe is supported at the rear end only, the discharge end thereof tends to sag and thus eventually reaches a position eccentric to the interior of the surface of the bott, thereby causing the cooling water to be discharged at a non-uniform distance and velocity with respect to different circumferential portions of the interior surface of the bott, which results in protective slag coating of non-uniform depths on various portions of the exterior surface thereof. Since the extension of the discharge end of the supply pipe in prior devices is of random or uncontrolled length, due to the nature of the mounting and fitting arrangements of the variably threaded return pipe to which the bott is secured, cooling water may in some instances be discharged in close proximity to the interior nose surface of the bott, and in other cases such discharge may take place at a considerable distance from the nose surface. In the former case, the clearance between the discharge end of the supply pipe and the nose of the bott is frequently restricted to such an objectionable degree that proper circulation of the cooling water is impeded. Under the latter condition, the maximum cooling effect is obtained, not at the nose interior surface where it is most urgently needed, but at a zone to the rear thereof. The protective slag coating on the nose of the bott thus progresses to a lesser depth than is required to protect this nose portion of the bott, and in prior devices, early failure frequently occurs. My invention aims to overcome the foregoing inherent disadvantages of prior devices.

The invention will be fully apparent from the following detailed disclosure when read in connection with the accompanying drawing, and will be defined with particularity in the appended claims.

Figure 1:
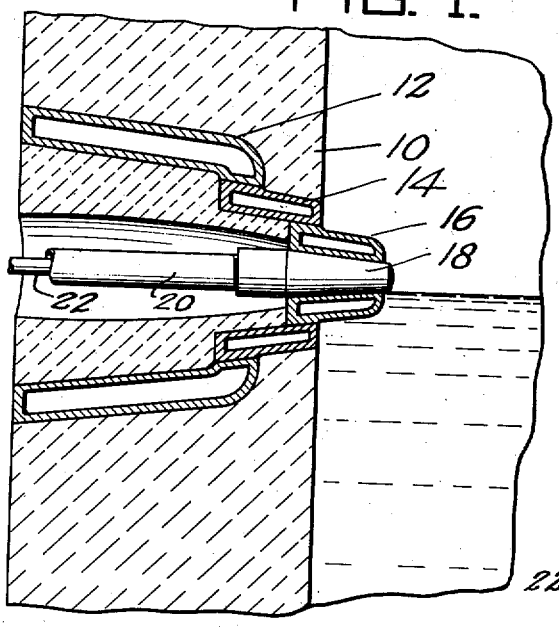
Figure 1 is a sectional elevation of a portion of a blast furnace showing the cinder notch thereof equipped with a device embodying the invention.
Figure 3:
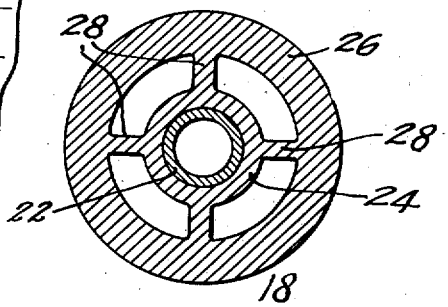
Figure 3 is a sectional view on line III—III of Figure 2.

In the improved cinder notch stopper of my invention, the external shape, the wall thickness, and the length of the bott are in general somewhat similar to corresponding elements in known types of cinder notch stoppers or botts. An outstanding distinction of the present invention resides in the provision of an internal spider-like or webbed element within the body of the stopper, this spider-like element having a hub portion arranged to slidingly or freely support the inner extremity of the pipe which conveys a cooling medium such as water to the interior of the stopper. As clearly shown in the drawing, the lower portion 10 of the blast furnace is provided with the usual cinder cooler 12 which is a jacketed casting through which cooling water is circulated. This cooler carries the usual monkey cooler 14 which is also a hollow casting through which cooling water is circulated. Projecting forwardly from the monkey cooler 14 is the monkey 16, the latter projecting inwardly into the blast furnace chamber, as shown. The cinder notch stopper sometimes referred to as the bott is indicated generally at 18, and as shown, has a generally frusto-conical exterior surface adapted to make a snug fit with the similar cone-like surface of the monkey. The cinder notch stopper or bott 18 is formed of cast iron or steel, and is mounted on a pipe 20 having exterior screw threads formed thereon for engagement with internal threads formed near the outer extremity of the stopper.

Figure 2:
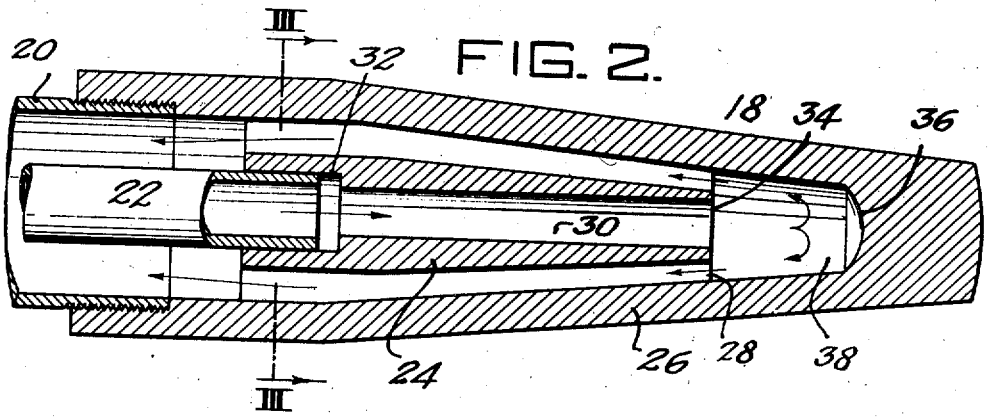
Figure 2 is an enlarged longitudinal sectional view through a cinder notch stopper of the present invention.

Located coaxially within the pipe 20 there is a supply pipe 22 by means of which cooling medium is introduced into the interior of the cinder notch stopper. In the stopper of the present invention, special means are provided for maintaining the inlet pipe 22 accurately in position so as to insure that the pipe is properly positioned to uniformly distribute cooling water. To this end, the cooler of my invention is provided with an internal spider-like webbed element comprising an inner hollow hub 24 spaced from the outer annular wall 26 of the stopper by a plurality of radial webs 28. The central opening 30 of the hollow hub 24 is of sufficient cross-sectional area to afford free passage of an adequate flow of cooling water, the water volume and pressure being approximately the same as that used in conventional practice. The rear of the hub 24 is provided with an enlarged socket 32 into which extends the extremity of the pipe 22, the pipe making a working fit therewith so that relative movement between the two can take place, due to expansion and contraction, thus providing for accurate centering of the supply pipe 22 within the outlet pipe 20. The distance between the inner end 34 of the hub 24 and the inner surface 36 of the stopper nose chamber 38 is believed to be somewhat critical, in order to assure maximum cooling effect upon this nose surface, as well as to obtain a strong scouring and cleansing action from the velocity of the cooling water impinging upon such inner nose surface. It has been demonstrated that for application to iron blast furnaces operating at temperatures approximately 2700° to 2800° F., using cooling water at the rate of approximately ten gallons per minute at a pressure of 20 pounds, a distance of 1½ inches between the nose surface 36 and the inner end 34 of the hub gives an entirely satisfactory cooling effect and also provides for a strong scouring action sufficient to carry away silt, sand and scale which would otherwise remain or become lodged in the chamber 38 adjacent the nose of the stopper. In the stopper or bott of my invention, it is apparent that the nose portion is at all times subjected to the maximum cooling effect. Thus the greatest depth of protective slag coating will be formed on the exterior thereof. An important feature of the described construction is that the plurality of webs 28 which connect the hollow hub 24 with the main body portion of the stopper also provides means for increasing the rate of heat transfer from the outer body portion of the stopper inwardly through such webs to the cooling water. This rate of heat transfer is further enhanced by forming the stopper of copper, copper alloy, or equivalent metal having a high degree of heat conductivity. Since the inner hollow hub 24 is integrally connected with the outer shell-like body of the stopper by the several webs as shown, a high rate of heat transfer is maintained, and thus increased cooling effect of the water circulating from the pipe 22 in the direction of the arrow shown is secured. This water circulation, it will be understood, is from the inlet pipe 22 through the central opening 30 of the hub of the inner webbed element whence it is impinged on the inner nose surface 36, whereupon reverse flow takes place, the body of water being uniformly distributed and circulated rearwardly through the multiplicity of separate passages formed by the webs 28, the water then flowing outwardly, as indicated by the arrows in Figure 2, through the outlet pipe 20. By utilization of the invention, a greater depth of protective slag coating is formed uniformly over the entire surface of the bott, its life is lengthened, and important savings are effected due to such lengthened life and the avoidance of interference in normal furnace operations by premature failure such as was apt to occur with the conventional bott heretofore used.

In the bott or stopper illustrated, the inner element or hollow hub 24 has been shown and described as integrally connected with the outer frusto-conical shell by the ribs or webs illustrated. It is to be understood, however, that the outer shell may be of one-piece construction formed by a casting, and a separate inner portion can be provided with radial webs arranged to make a snug fit with the inner surface of the outer shell or body of the stopper, or radial webs can extend inwardly from the shell and the hollow hub could be formed of a separate piece.

While I have described quite precisely the specific embodiment of the invention illustrated, it is to be understood that the above-mentioned and various other modifications may be made without departure from the invention as defined in the appended claims.

I claim:

1. A blast furnace cinder notch stopper comprising a hollow shell having a closed nose at one end, an inner hollow element enclosed by said shell, the inner end of said element terminating short of said nose so as to leave a chamber between them with which the hollow portion of said element communicates, equally spaced webs between the shell and the element extending from end to end of said element and spacing the latter from the shell, a cooling medium supply pipe opening into the hollow interior of said element and an outlet pipe communicating with and secured to the end of the shell remote from said closed nose whereby a cooling medium introduced inwardly through said hollow element toward the nose is caused to flow rearwardly between the exterior of said element and the shell in separate streams defined by said webs to said outlet pipe.

2. In a blast furnace, a cinder notch and a stopper therefor comprising a hollow frusto-conical shell having at one end a closed nose, an inner element having on the exterior thereof longitudinally disposed radial webs extending to the inner surface of the shell thus spacing the element from the shell, said element having a passageway extending longitudinally therethrough and opening into the chamber between said nose and the inner end of said element, a cooling medium supply pipe communicating with said passageway and making a slip-fit therewith at the end thereof remote from the said nose, and an outlet pipe surrounding the supply pipe and communicating with the end of the shell remote from the closed nose, the device being so constructed and arranged that a cooling medium directed forwardly through said hollow element toward the nose of the stopper is caused upon contacting the nose to flow rearwardly between the exterior of said element and said shell in a plurality of separate streams defined by said webs, thus distributing the flow of said cooling medium quite uniformly throughout the annular space between the shell and said element, said radial webs being circularly spaced the same distances apart around the exterior of said inner element and being coextensive in length with said element.

3. A blast furnace cinder notch stopper comprising an elongated tapered shell having a closed nose adapted to extend into the interior of a blast furnace, a hollow element disposed centrally within the said shell and spaced therefrom by a plurality of radially extending webs spaced equally around the exterior of said element and coextensive in length therewith and serving to divide the annular space between the shell and the interior of the stopper into a plurality of uniform longitudinally extending passageways of equal cross sectional area, a supply pipe making a slip-fit with said element, and an outlet pipe surrounding the supply pipe and secured to the end of said shell remote from said closed nose, the parts of the device thus being so arranged that a cooling medium directed forwardly through said supply pipe toward the nose of the stopper is caused to flow rearwardly through said passageways in substantially uniform separate streams to said outlet pipe.

4. In a cooling system for blast furnace cinder notch stoppers, a cooling medium supply pipe, an elongated inner element adapted to receive the delivery end of said supply pipe and having a longitudinal passageway therethrough, an enclosing shell for said element having a closed nose spaced from the forward end thereof and providing a return passageway between the shell and the element, and a plurality of webs coextensive in length with the element and extended radially therefrom to the inner surface of said shell.

5. A blast furnace cinder notch stopper comprising a hollow shell having a closed nose at one end, an inner hollow element enclosed by said shell, the inner end of said element terminating short of said nose so as to leave a chamber between them with which the hollow portion of said element communicates, webs between the shell and the element spacing the latter from the shell, a cooling medium supply pipe whose inner extremity is supported by and opens into the hollow interior of the outer end of said element and makes a slip-fit therewith, and an outlet pipe communicating with and secured to the outer extremity of the shell remote from said closed nose whereby a cooling medium introduced inwardly through said hollow element toward the nose is caused to flow rearwardly between the exterior of said element and the shell in separate streams between said webs to said outlet pipe.

HERMAN F. DOBSCHA.